United States Patent
Shapira (10) Patent No.: US 7,403,499 B2
(45) Date of Patent: Jul. 22, 2008

(54) METHOD AND APPARATUS FOR ESTIMATING TRANSMISSION POWER TO SUBSCRIBER UNITS IN A CELLULAR SYSTEM

(76) Inventor: Aharon Shapira, 27 Kaufman St., Haifa 34780 (IL)

( * ) Notice: Subject to any disclaimer, the term of this patent is extended or adjusted under 35 U.S.C. 154(b) by 982 days.

(21) Appl. No.: 10/724,162

(22) Filed: Dec. 1, 2003

(65) Prior Publication Data

US 2004/0116144 A1    Jun. 17, 2004

(30) Foreign Application Priority Data

Dec. 12, 2002    (IL)    ................................ 153420

(51) Int. Cl.
*H04Q 7/00*    (2006.01)
(52) U.S. Cl. ..................................... 370/328
(58) Field of Classification Search ................ 370/310, 370/312, 328, 329, 342, 431, 432, 437, 441, 370/458, 464, 465
See application file for complete search history.

(56) References Cited

U.S. PATENT DOCUMENTS

| | | | |
|---|---|---|---|
| 6,058,107 A * | 5/2000 | Love et al. ................... | 370/332 |
| 6,335,922 B1 * | 1/2002 | Tiedemann et al. .......... | 370/335 |
| 6,393,012 B1 * | 5/2002 | Pankaj ........................ | 370/342 |
| 6,396,867 B1 | 5/2002 | Tiedemann, Jr. et al. | |
| 6,539,050 B1 * | 3/2003 | Lee et al. .................... | 375/146 |
| 6,621,804 B1 * | 9/2003 | Holtzman et al. ........... | 370/329 |
| 6,717,931 B2 * | 4/2004 | Wang et al. .................. | 370/335 |
| 6,745,044 B1 * | 6/2004 | Holtzman et al. ........... | 455/522 |
| 6,763,009 B1 * | 7/2004 | Bedekar et al. ............. | 370/335 |
| 6,907,250 B2 * | 6/2005 | Ishikawa et al. ............ | 455/450 |
| 6,944,460 B2 * | 9/2005 | Haartsen ................... | 455/452.2 |

OTHER PUBLICATIONS

Aharon Shapira, U.S. Appl. No. 10/654,419, filed Sep. 4, 2003, not yet published.
Jhong Sam Lee and Leonard E. Miller, "CDMA Systems Engineering Handbook," 1998., pp. 1178-1186, Artech House Publishers, Boston.
Mobile Station-Base Station Compatibility Standard for Dual-Mode Spread Spectrum Systems, EIA/TIA-95-B, pp. i to xxxii and pp. 1-1 to 1-7 and p. 7-93, 1998.

* cited by examiner

*Primary Examiner*—Dmitry Levitan (57) ABSTRACT

A cellular radio system transmits data from an IP-based network, through a base station controller (BSC) and any Base Station Transceiver (BTS) controlled by the BSC, to a plurality of active subscriber units. Instantaneous data transmission from the BTS to any active subscriber unit is at one of a plurality of given transmission rates and at a defined power level that is a product of a specific power and a multiplier, relative to a maximum total power transmittable by the corresponding BTS. A method for estimating the instantaneous specific power of transmission from the BTS to active subscriber units comprises defining in time a succession of observation windows, observing the data flowing into the BSC and addressed to each of the active subscribers and, for each subscriber, measuring the data flow during each of the observation windows, thus allowing calculation of an estimated specific power for each of the subscribers.

15 Claims, 6 Drawing Sheets

Assigned channel rate levels

| Subscriber | Allocation Time Slot | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| A | 2 | 2 | 4 | 4 | 2 | 2 | 1 | 4 | 1 | 2 | 1 | 2 | 4 | 1 | 2 |
| B | 1 | 16 | 2 | 4 | 4 | 4 | 8 | 2 | 1 | 8 | 16 | 2 | 1 | 1 | 16 |
| C | 8 | 8 | 4 | 8 | 4 | 16 | 8 | 8 | 4 | 8 | 8 | 2 | 8 | 4 | 16 |
| D | 2 | 2 | 2 | 1 | 1 | 2 | 2 | 1 | 2 | 2 | 1 | 4 | 2 | 4 | 1 |
| E | 8 | 1 | 4 | 8 | 16 | 4 | 8 | 8 | 16 | 4 | 8 | 2 | 4 | 4 | 1 |

FIG. 2b

Specific Power

| Subscriber | |
|---|---|
| A | 0.1 |
| B | 0.02 |
| C | 0.015 |
| D | 0.16 |
| E | 0.03 |

| Subscriber | Allocation Time Slot | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| A | 0.2 | 0.2 | 0.4 | 0.4 | 0.2 | 0.2 | 0.1 | 0.4 | 0.1 | 0.2 | 0.1 | 0.2 | 0.4 | 0.1 | 0.2 |
| B | 0.02 | 0.32 | 0.04 | 0.08 | 0.08 | 0.08 | | | 0.02 | 0.16 | 0.32 | 0.04 | 0.02 | 0.02 | 0.32 |
| C | 0.12 | 0.12 | 0.06 | 0.12 | 0.06 | 0.24 | 0.16 | | 0.06 | 0.12 | 0.12 | 0.03 | 0.12 | 0.06 | 0.24 |
| D | 0.32 | 0.32 | 0.32 | 0.16 | 0.16 | 0.32 | 0.12 | | 0.32 | 0.32 | 0.16 | 0.64 | 0.32 | 0.64 | 0.16 |
| E | 0.24 | 0.03 | 0.12 | 0.24 | 0.48 | 0.12 | 0.32 | | 0.48 | 0.12 | 0.24 | 0.06 | 0.12 | 0.12 | 0.03 |
| Total: | 0.9 | 0.99 | 0.94 | 1 | 0.98 | 0.96 | 0.94 | | 0.98 | 0.92 | 0.94 | 0.97 | 0.98 | 0.94 | 0.95 |

Relative power levels

| | | Observation Window | | | | |
|---|---|---|---|---|---|---|
| | | 1 | 2 | 3 | 4 | 5 |
| Subscriber | A | 2.7 | 2.7 | 2.0 | 1.7 | 2.3 |
| | B | 6.3 | 4.0 | 3.7 | 8.7 | 6.0 |
| | C | 6.7 | 9.3 | 6.7 | 6.0 | 9.3 |
| | D | 2.0 | 1.3 | 1.7 | 2.3 | 2.3 |
| | E | 4.3 | 9.3 | 10.7 | 4.7 | 3.0 |

FIG. 5a

| | | Observation Window | | | | |
|---|---|---|---|---|---|---|
| | | 1 | 2 | 3 | 4 | 5 |
| Subscriber | A | 0.27 | 0.27 | 0.20 | 0.17 | 0.23 |
| | B | 0.13 | 0.08 | 0.07 | 0.17 | 0.12 |
| | C | 0.10 | 0.14 | 0.10 | 0.09 | 0.14 |
| | D | 0.32 | 0.21 | 0.27 | 0.37 | 0.37 |
| | E | 0.13 | 0.28 | 0.32 | 0.14 | 0.09 |
| | Total: | 0.94 | 0.98 | 0.96 | 0.94 | 0.95 |

FIG. 7

METHOD AND APPARATUS FOR ESTIMATING TRANSMISSION POWER TO SUBSCRIBER UNITS IN A CELLULAR SYSTEM

FIELD OF THE INVENTION

This invention relates to data transmission in a cellular radio system and, in particular, to allocation of transmission resources of a transmitter among connected subscribers.

BACKGROUND OF THE INVENTION

Figure 1:
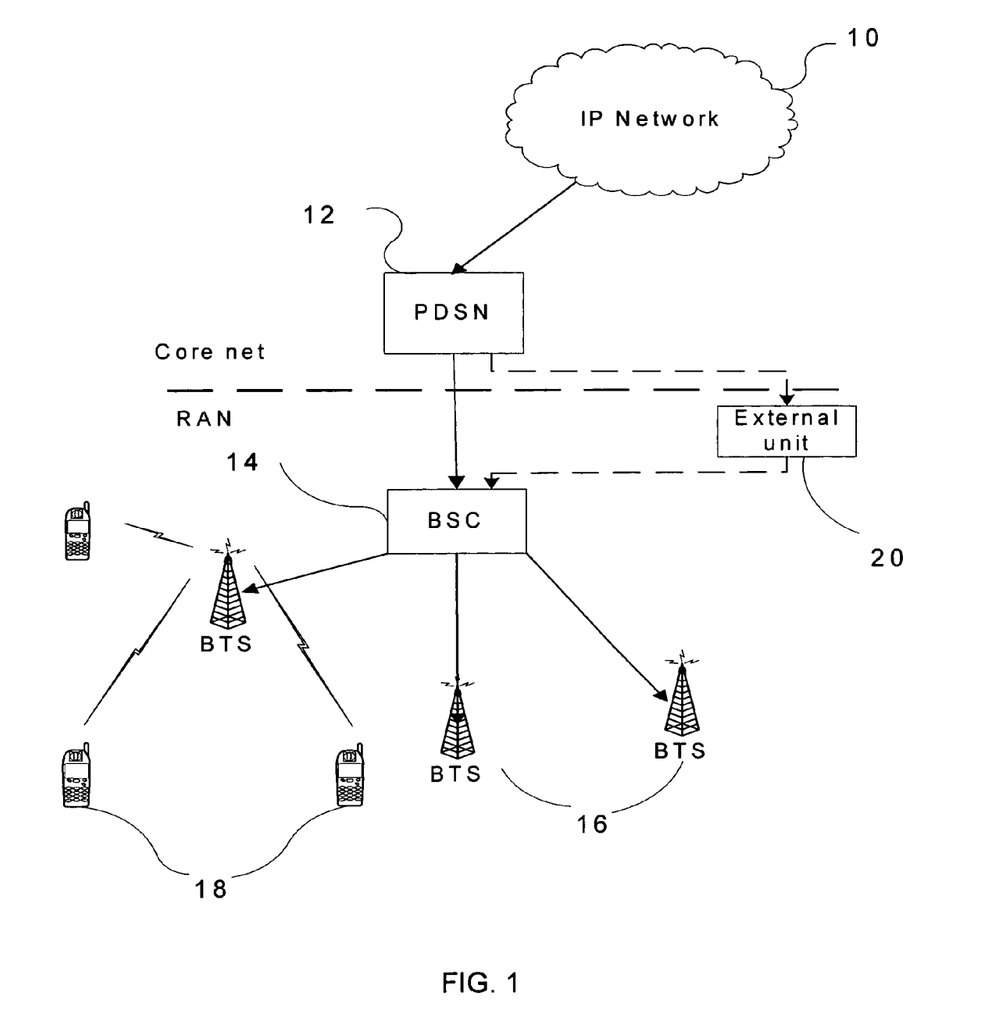
FIG. 1 is a schematic block diagram of major components involved in down-stream data transmission in a typical cellular system.

Cellular radio systems, commonly used for telephony, are increasingly used for transmission of data from various sources to subscribers. The data are usually requested by a subscriber, by means of the cellular system, and transmitted to the cellular system from appropriate sources over the Internet (or any other external IP network). A block diagram of the major components of a typical system involved in the down path of data transmission is shown in FIG. 1. The data obtained from an external network 10 are passed through the core network of the cellular system, which in a CDMA system, for example, comprises a Packet Data Service Node 12 (PDSN), and a Base Station Controller 14 (BSC—forming part of a Radio Access Network—RAN) to a Base Transceiver Station 16 (BTS), with which the requesting subscriber is linked, and finally radio-transmitted from the BTS to the respective subscriber unit 18 (SU). From the instant that data are requested until all requested data have been received, the SU is in a data connection state. In conformance with the TCP Protocol, all data are transmitted as packets; each packet arriving at the SU is either acknowledged or, if a network-caused error is detected or if a packet has not been received within a certain time period, its retransmission is requested. Data arriving at any one BSC are accumulated in buffer storage, where a storage bin, or queue, is designated for each active subscriber unit, that is—for each SU that is in a data connection state and in radio communication with any BTS controlled by that BSC. Data are transmitted from the buffer to the SUs according to some schedule, explained below. The present invention is concerned with the data flow from the core network (hereinafter referred to as PDSN—its manifestation in typical CDMA systems), through a buffer storage bin, over the base station's radio transmitter, to the receiver in the SU.

Cellular data transmission differs from cellular voice transmission in several aspects: (a) The rate of transmission, in the case of data, varies greatly with time, as well as among subscriber units and with the type of application, while for voice it remains constant. (b) Moreover, the rate for data may exceed that for voice by orders of magnitude. (c) Data need not, generally, be transmitted continuously, but may be transmitted in bursts (i.e. many packets in close succession), with considerable intervals between them; however certain types of data applications (notably streaming types) have different tolerances to duration of intervals. (d) Various subscribers may be given different levels of quality of service (QoS)—for example, in terms of guaranteed minimum transmission rate. In order to accommodate these characteristics, new operating standards are being introduced to cellular systems. In particular, systems using the Code Division Multiple Access (CDMA) mode of transmission, have a new standard, known as CDMA 2000.

As is known, a channel in a CDMA system is defined by a particular code out of a set of N mutually orthogonal codes, known as a Walsh set. According to the CDMA 2000 standard there are defined, for any one radio transmission facility (e.g. a radio carrier), a set of $N=2^n$ fundamental channels, in terms of N Walsh codes, where N is typically 64 (n=6). Typically, a fundamental channel (FCH, also known as 1× channel, which is similar to a regular voice channel) carries data at a rate of about 10 Kbits per second. By defining suitable common subsets of the codes, fundamental channels are combinable, in a hierarchical manner into higher-rate (i.e. wider-bandwidth) channels as follows: A set of N/2 (e.g. 32) 2× channels, each carrying about 20 Kbits per second; a set of N/4 (e.g. 16) 4× channels, each carrying about 40 Kbits per second; and so on. The corresponding Walsh codes are designed as a hierarchical binary structure, wherein, at each level, a code is a subset of certain two codes at the next lower level. Thus, for example, a 4× code is a subset of four related fundamental channel codes (two levels lower). At any time, any available channel at any of the given rates (i.e. at any of the rate levels discussed above) may be allocable to any active subscriber unit, subject to the hierarchy discussed above and to certain constraints discussed below.

In common with other cellular systems, in a system operating under the CDMA 2000 standard, the signal power transmitted to any subscriber unit (SU) is a function of the radio transmission channel quality (which depends, inter alia, on the distance between the subscriber unit and the base station), whereby the power is adjusted to maintain a given ratio between the received signal and the combination of noise and interference. This ratio is, however, also a function of the channel bandwidth and thus of the rate level of the channel; the higher the rate (i.e. the wider the band), the lower the processing gain of the CDMA and thus the higher the required transmission power. It is also to be noted that the total power of all signals transmitted at any instant is subject to a maximum value, characteristic of the transmitter.

The transmission from each BTS to active subscriber units of data, addressed to them and accumulated in the buffer storage, is scheduled by periodically allocating them channels. According to current practice, each cycle of allocations is carried out for an ensuing allocation time slot, whose duration is in the order of a few hundred milliseconds, typically as follows: A storage bin is selected on a round-robin basis (or at random) and the amount of data accumulated therein is compared with a series of threshold values; according to the outcome, a commensurate transmission rate is selected from among the given levels. If a channel of that rate is available, it is allocated to the subscriber unit corresponding to the bin, provided that the power required to transmit it to the subscriber unit does not cause the total power to exceed the maximum. Failing this, a channel of half the desired rate, if available, is allocated to that subscriber unit, again subject to the power test; and so on. Another bin is then chosen and the same process is followed. This cycle is repeated until there are no channels left or until any allocation would cause the maximum available power to be exceeded or until there are no data waiting in storage. In order to maintain the radio communication, a fundamental channel (at the lowest rate level) is usually allocated to each active SU for which there are (temporarily) no data waiting in the buffer. Variations of the allocation procedure described above are also in common practice; in one prevalent variation, allocation is carried out at the beginning of each allocation time slot for several time slots ahead, the allocation being corrected or supplemented at each successive time slot. According to the results of the allocation, data are transmitted to SUs during the ensuing allocation time slot and subsequently another allocation is made. Thus, during each allocation time slot, some (possibly all) active SUs receive data, each at some rate and some power level that is associated with the rate, while the total transmitted power from the BTS is generally near its maximum; the rates of transmission to the various SUs generally vary from one allocation time slot to another. The process of channels allocation is also, and more generally, referred to as scheduling.

Scheduling procedures in present practice, as outlined above, do not optimally utilize the limited transmission resources, which are the overall data rate capacity and the maximum overall power. In particular, they allow spending an inappropriately large portion of the power on high rate transmission to subscriber units having poor radio reception; they also cause transmission rates to be dependent solely on buffered data sizes, which by themselves are random, and possibly on random selection. Moreover, procedures in present practice do not generally include QoS considerations and also cannot be geared to any business policy, such as would control transmission so as to maximize some variable (which may, for example, be overall transmission rate or overall revenue). Since scheduling and channel allocation procedures, as described above, are built into currently available realizations of the BSC and are not easily modifiable, an external scheduling unit has been proposed, which is designed to be interposed in the path of the downstream data between the PDSN and the BSC and to preferably control the rate of data ingressed to each bin of the buffer in the BSC. Such an external unit, e.g. 20 in FIG. 1, would typically include a program for periodically allocating the resources of the various BTSs to the corresponding subscriber units, whereby also some or all of the other factors outlined above have an effect. A method underlying such a program has been disclosed, for example, in co-pending Israeli Patent Application No. 151644, filed on Sep. 5, 2002 by the present applicant and entitled "Allocation of radio resources in a CDMA2000 cellular system".

One of the most important factors being brought to bear in an external scheduling unit is the power level currently required for radio transmission to each active subscriber unit (which, as noted above, is a function of its reception conditions and varies greatly with time). That power level is known to the BSC, through communication with the BTSs. However, this information is generally not available at the standard interface between the BSC and the PDSN. Thus any external scheduling unit, which, as noted, is typically interposed in that interface, has no means by which to directly obtain information on current power levels of transmission to subscriber units. There is therefore a need for a method to obtain at least an estimate of the power levels required for radio transmission to the subscriber units, in order for an external scheduling unit to effectively carry out its function. A similar need may exist in an external unit that controls data flow to the BSC for also other purposes or in any other type of external units.

SUMMARY OF THE INVENTION

The present invention is of a method for estimating the power currently required for radio transmission of data to each active subscriber unit linked to any one base transceiver station (BTS). The estimation according to the method of the invention is based solely on observing the amount of data addressed to each of the subscriber units that ingresses the BSC over a short period of time, which will be referred to as an observation period and which consists of a certain number, N, of successive observation windows, of definable duration each. The duration of an observation window is typically equal to that of several, say W, allocation time slots in succession. The method is based, inter alia, on the following assumed operating conditions of the system and of each relevant BTS:

(a) Channel allocation at the BSC is generally as outlined above in the Background section.

(b) The BTS is operating at full, or nearly full, capacity—meaning that it transmits at a total power that is, most of the time, at or near its operational maximum.

(c) During each observation window there is some data transmitted to most of the active subscriber units connected to the BTS.

(d) The total rate of data addressed to subscriber units connected to the BTS and ingressed to the BSC approximately equals, on the average, the total rate of data actually transmitted to the subscriber units.

(e) Data packets received by the subscriber units are acknowledged to their respective sources and a flow control functionality within the TCP/IP protocol adjusts the respective data rates transmitted from the core system to the BSC so as to, over time, more nearly equal the respective received rates.

(f) Radio reception conditions of any one subscriber unit, and hence the required transmission power (at any given data rate) to that subscriber unit, vary slowly, that is—relatively little during the N observation windows.

It is to be noted that the latter condition (f) in effect limits the total duration of an observation period and defines the term "short" by which this period has been characterized above. To the extent that this condition is not met, except with unduly short observation windows (e.g. of only one or two allocation time slots each), the method may become inaccurate.

The method of the invention, carried out with respect to each BTS, essentially consists of measuring the amount of data, addressed to each active subscriber unit, that ingresses the BSC over a succession of observation windows and calculating therefrom a relative power level required for transmission at the fundamental rate to each subscriber unit (averaged over the succession of windows); the manner of the calculation will be explained in what follows. The calculated power levels form the basis for estimating the corresponding power levels over any succeeding period (as would be required, for example, for a power-dependent channel allocation process, such as carried out in an external scheduling unit).

In order to explain the calculation, we first define a Specific Power for each active subscriber unit as that fraction of the maximum total power transmittable by the BTS that is required to transmit data to the subscriber unit at the fundamental channel rate; it is noted that this is a relative power level. Clearly, to transmit data at any higher rate requires a commensurately higher power level. That level may be expressed as a multiple of the Specific Power, whereby the multiplier is approximately equal to the rate level designator (e.g. 2×, 4×, etc.) or any other known, possibly non-linear, function of the rate level designator. We now observe that, effectively, during any one time slot, the Specific Power of each allocated subscriber unit is multiplied by the factor that corresponds to the rate level of the channel assigned to it and, under the assumed condition (b) above, the products of all allocated subscriber units generally add up to 1 or nearly 1. We next observe that, in view of assumptions (d) and (e) above, the total data transmitted to each of the allocated subscriber units over an observation window is nearly equal to that measured at the ingress to the BSC. Dividing the measured amount of data for each subscriber unit by the duration of an observation window yields a corresponding average data rate. Further dividing this average rate by the rate of a fundamental channel (which is typically about 10 kb/s), yields an average rate multiplier, R, for each active subscriber unit. As explained above, the power level at which the data are transmitted to any one subscriber unit, whenever it is allocated a channel, is a multiple of its specific power, whereby the multiplier is generally a function (usually close to identity) of the rate multiplier R. It may therefore be safely assumed that, by analogy, also the average power level of a subscriber unit is a multiple of its specific power, the multiplier being equal to R or some function f(R). In view of assumption (b) above, we can thus write a linear equation, relating the specific powers of all the active subscriber units, as follows:

where R is the rate multiplier and SP is the specific power—all indexed by active subscriber units SU.

The rate measurement is repeated over several successive observation $$\Sigma f(R_{su}) \cdot SP_{su} = 1$$

windows, each time obtaining another set of $R_{su}$ values, which give rise to another, similar, linear equation, in which the $R_{su}$ values form the coefficients. If the number of active subscriber units is, say, N, it will suffice to measure ingress rates over N observation windows and to obtain therefrom $R_{su}$ values for a total of N equations. Under assumption (f) above, we can solve the set of N simultaneous equations for the N unknown values $SP_{su}$. Solution of the N linear equations, which is well known in the art, constitutes part of the calculation underlying the method of the invention. It is noted that typically, over any succession of observation windows, each window will generally have an allocation pattern (i.e. a combination of allocated subscriber units and rate levels) that is generally different from the others; this will generally hold true also when the allocation pattern is averaged over each observation window; this condition assures that the linear equations are independent.

The measurement of ingress data rates continues indefinitely over successive observation windows. After each such measurement, the last N sets of values are used for calculating an updated set of specific power values. Clearly, when knowing the specific power value for any subscriber unit, the relative power level required for transmission at any given rate level is readily calculable by multiplying the respective specific power value by the corresponding multiplier, as mentioned above.

It is noted that the specific power values obtained by the method of the invention, as described above, are to be regarded as estimates of the actual power levels used during transmission. The estimates are close to the actual values to the extent that the assumptions enumerated above hold true. Additional possible sources of error include random quantization effects, due to the channel allocation procedures and occasional empty buffers, lost (and later retransmitted) data packets, due to radio disturbances and to buffer overflows, and delays in the rate adjustment mechanism (assumption 'e' above), due to large buffers. An external control unit, as described in the Background section, may also introduce delays in the rate adjustment mechanism.

Preferably, the estimated power values serve as a basis for predicting future required power levels, and the latter are used in an external control—or scheduling unit, such as described in the Background section. The invention also contemplates an external unit, connected to the input of the BSC, for scheduling data transmission from any BTS to SUs and/or for controlling data flowing into the BSC, which unit includes a power estimator, operative to estimate the respective specific power values, using the method described above, and a scheduler and/or a data flow controller, responsive to the estimated specific power values and operative according to any method. Optionally, the scheduler or the data flow controller is also operative to predict, from the estimated values, the specific power required to transmit data to each subscriber during a given period following the observation period, its operation being responsive to the predicted specific power values. It is to be noted that in other configurations of the invention, the external unit may include the power estimator (which is a feature of the invention) alone or in combination with modules other than those discussed above.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 2A:
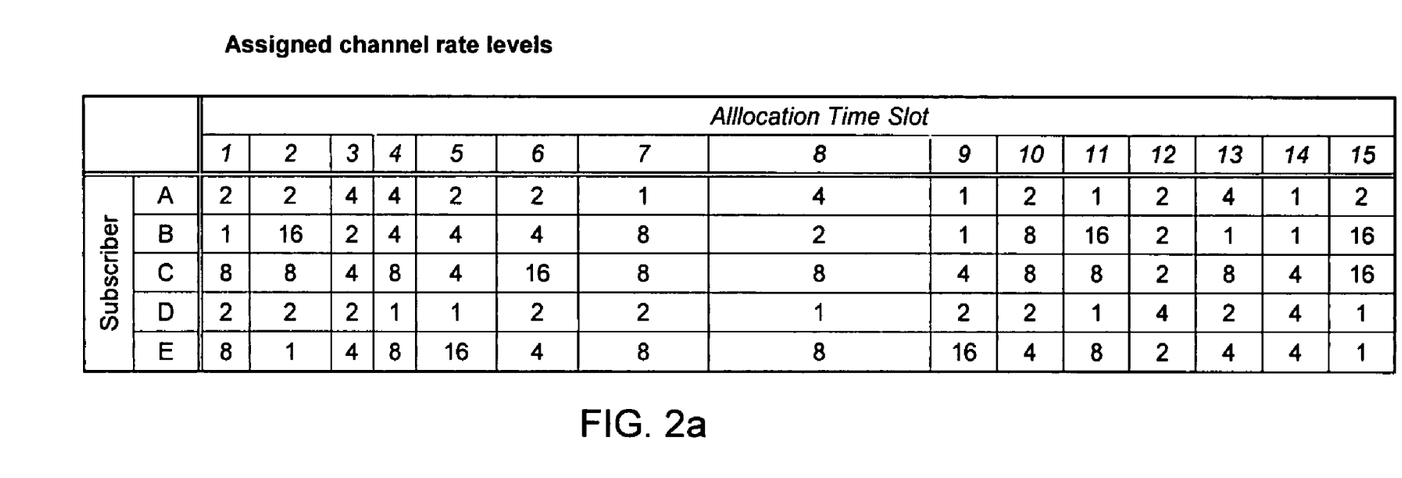
FIG. 2 contains tables of exemplary parameter values concerning data transmission from a transceiver to subscribers over an exemplary time period.

Reference is made to FIG. 2, which presents various values concerning an exemplary situation of data transmission from a base-station transceiver to active subscriber units over an exemplary time period. For the sake of illustration, only fifteen consecutive allocation time slots are considered and the number of active subscriber units has been assumed to be only five and to remain constant over the period. FIG. 2A represents the assumed channels usage in this example. More specifically, FIG. 2A shows the rate level at which data is transmitted to each subscriber unit at each allocation time slot. A rate level, R, is a multiplier, which, when multiplying the fundamental channel rate (which is usually about 10 kb/s), yields the transmission rate of the channel with which it is associated. It is to be noted that in the application of the method of the invention, of which this is an example, we are not concerned with the manner by which channels have been assigned to the subscriber units; we need only assume that all active subscriber units are served to some extent over any given period and, as will be further discussed below, that channels are assigned so that the total transmission rate at each time slot is limited only by the maximum power of the radio transmitter. It should further be noted that, according to common practice, each active subscriber unit is assigned at each time slot a channel of at least level 1 (i.e. a fundamental channel), regardless of the size of its queue in the buffer.

Figure 2B:
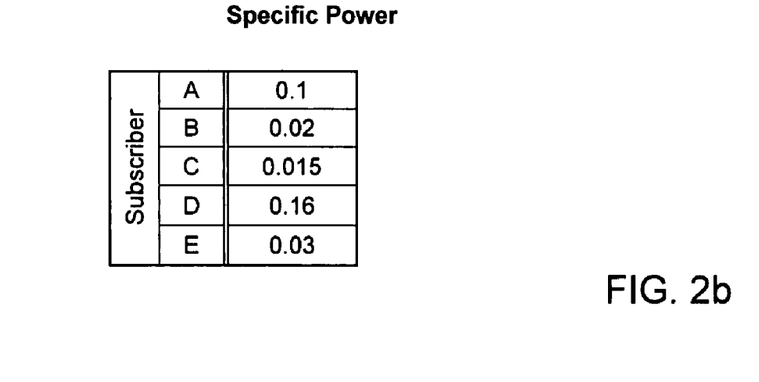

FIG. 2B represents the assumed radio transmission conditions over the exemplary period. More specifically, FIG. 2B shows the specific power for each of the five subscriber units, which is the relative power required to transmit data to the respective subscriber unit at the fundamental channel rate. Relative power is the transmitted radio power, expressed as a fraction of the maximum transmittable power. As explained above, specific power is a function of the radio transmission conditions. Transmitting data at a rate higher than that of a fundamental channel requires a commensurately higher power. The relationship between such higher relative power level, p, and the specific power, sp, is a function of the rate level, R:

$$p/sp = f(R) \quad (\text{eq. 1})$$

The function f is generally non-linear, but usually is practically close to an identity function, that is:

$$p/sp = R. \quad (\text{eq. 2})$$

Figure 2C:
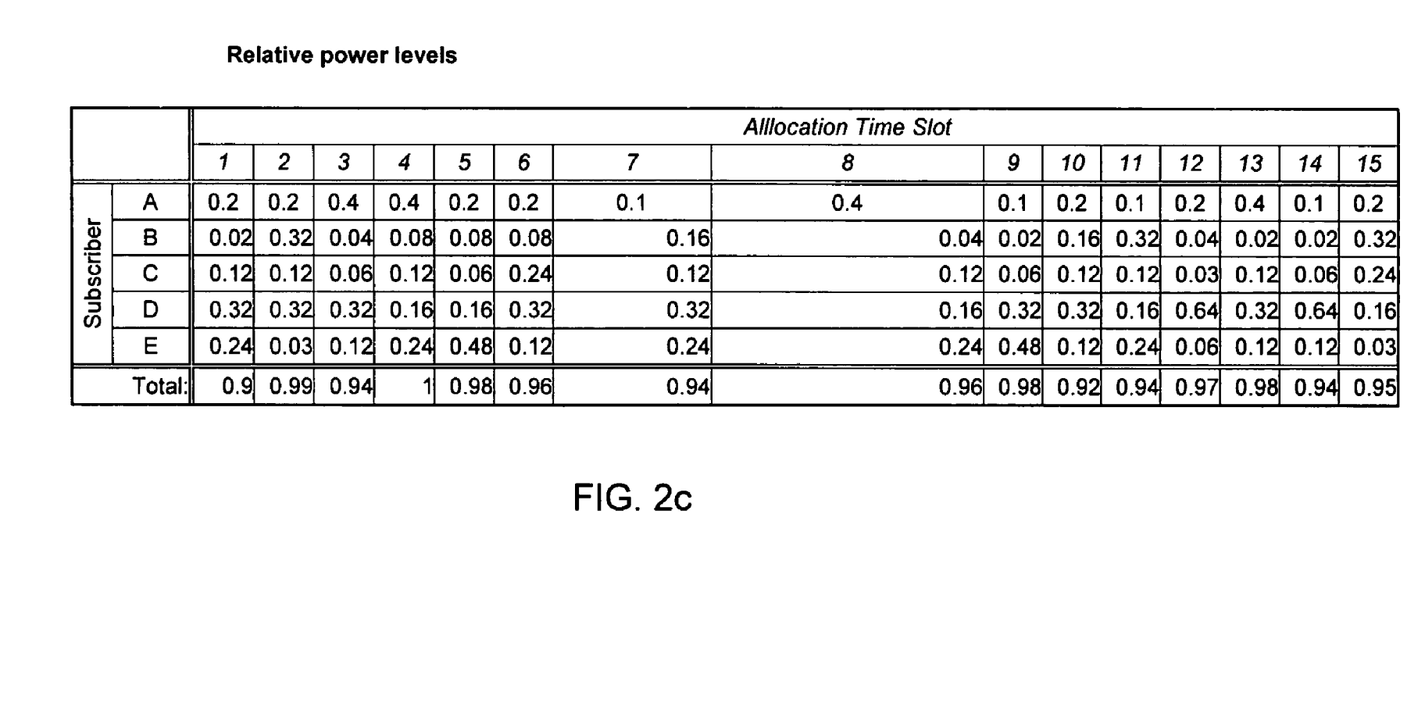

FIG. 2C shows the assumed relative power levels of transmission to each subscriber unit at each time slot. It has been obtained by assuming eq. 2 to hold true and thus multiplying each entry of FIG. 2A by the specific power of the corresponding subscriber unit (per FIG. 2B). The bottom row of the table contains, for each allocation time slot, the sum of the relative power levels of all five subscriber units, which is the total power transmitted at the time slot. It is observed that these totals are between 0.9 and 1 and this signifies that the total transmitted power was at all times close to the maximum possible. It is further observed that the relative power levels for the individual subscriber units do generally vary among the time slots in what appears to be a random manner, which reflects the apparently random rate (channel) assignment, seen in FIG. 2A. The latter probably results, inter-alia, from the interaction between the discrete nature of the channel rate structure, as well as of the IP packets, the algorithm of channel assignment and the randomness of data ingress to the BSC's buffers.

Figure 3:
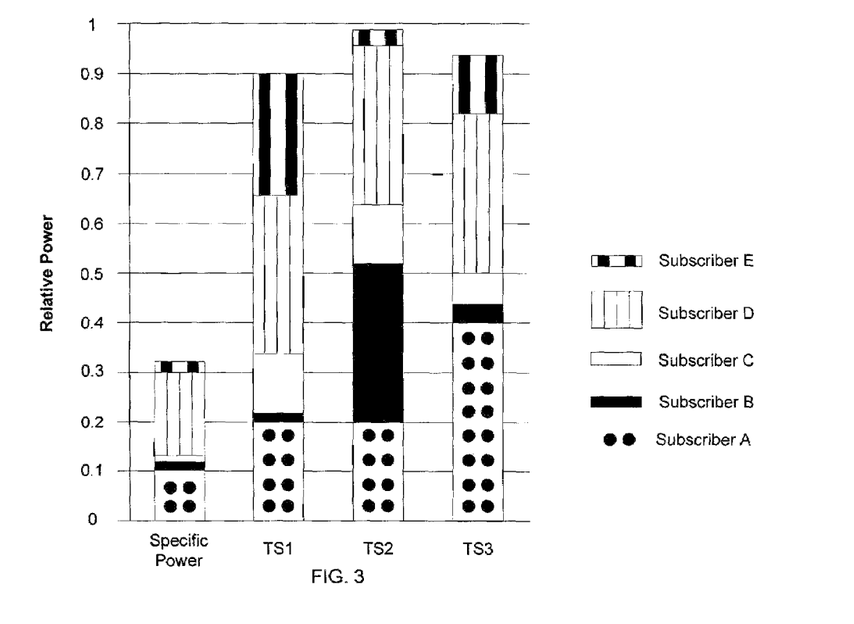
FIG. 3 is an illustrative diagram of values derived from the values of FIG. 2.

FIG. 3 is a column diagram that shows graphically some of the values of FIG. 2. The first, left-hand, column represents the specific power values for the five subscriber units. The other three columns represent the relative power levels transmitted during the first three time slots. In each column the segments for the five subscriber units are stacked, so that the height of the column represents the total transmitted power. It is again observed that the total values are practically close to 1. It is pointed out that FIGS. 2 and 3 serve to illustrate an exemplary transmission situation, to be used to explain the method of the invention; they do not, however, illustrate the method itself or its effects. It is, further, important to note that the values of the variables that are represented in these figures are not known and not available outside the RAN; it is, in fact, an object of the method of the invention to estimate the latest values of the specific power for each subscriber unit, such as those appearing in FIG. 2B for the present example.

The method of the invention will now be explained with reference to FIGS. 4 and 5, as well as to FIG. 1, and on the basis of the exemplary transmission situation of FIGS. 2 and 3.

According to the invention, data packets ingressing Base Station Controller (BSC) 14 are observed and classified as to the subscriber unit to which they are addressed. The number of ingressing packets for each subscriber unit over each of a succession of time periods is measured and noted. Such a time period is called an observation window and its duration is typically that of several consecutive time slots. The duration of an observation window is determined as a compromise between two constraints: On the one hand, the duration should be short enough so that over a certain number of windows (as explained below), together constituting an observation period, the specific power values may be deemed constant, that is—the radio transmission conditions do not vary significantly. On the other hand, the duration of an observation window should be long enough so that gross fluctuation in the flow, due to discrete buffer fillings (resulting from the discrete and irregular channel assignment process), are smoothed out. A duration of 3-6 allocation time slots has been found to be a practical compromise. It is noted that the duration need not be that of an integral number of allocation slots, nor need the timing of the windows be synchronized to that of the allocation slots. Successive windows preferably occupy consecutive and adjacent time periods, but this is not necessary and successive windows may overlap or, alternatively, occur with time gaps between them.

In the context of the present explanation we choose, by way of a simple example, the duration of each observation window to be exactly three allocation time slots and successive windows to be consecutive in time. The relationship between a train of such windows and the train of allocation slots in our exemplary transmission situation is depicted schematically in FIG. 4. Here the succession of observation windows 44 is seen to be synchronous with the train of time slots 42, although their respective boundaries do not necessarily align. Within the train of allocation time slots 42, certain fifteen consecutive slots are numbered, to denote correspondence with the exemplary allocation time slots of FIG. 2. Also within the succession of observation windows 44, certain five consecutive ones are numbered for the discussion below.

Figure 4:
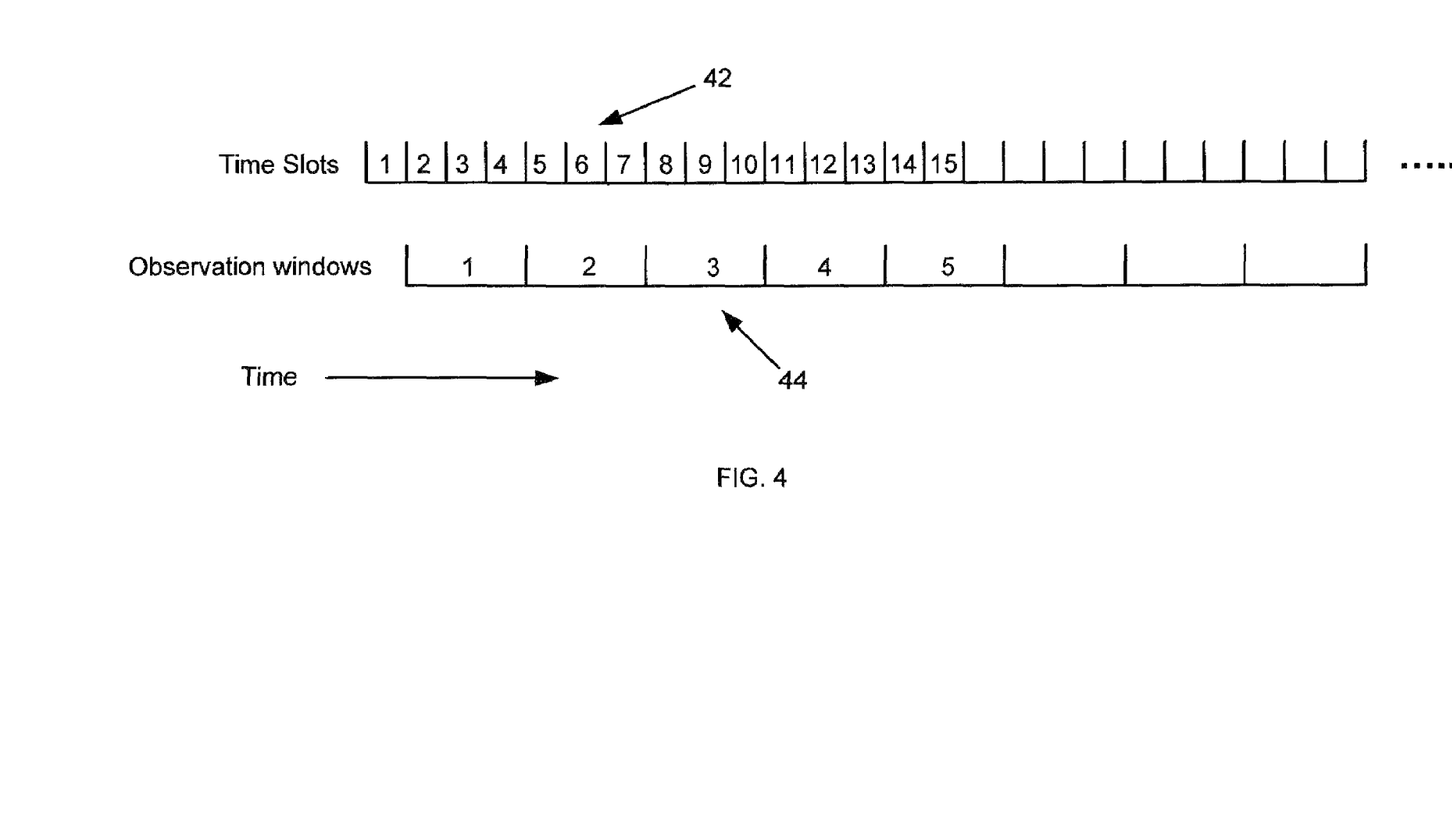
FIG. 4 schematically depicts a train of time slots and an exemplary train of observation windows according to the invention.
Figure 5A:
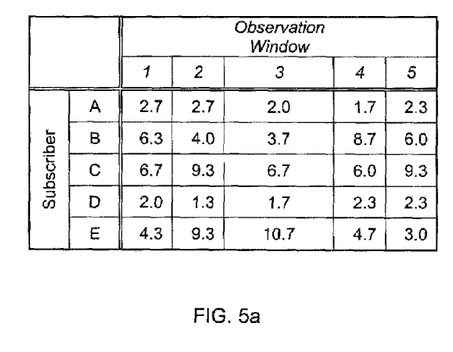
FIG. 5 contains tables of values derived from the values of FIG. 2, some of which represent values measured according to the method of the invention.

We now turn to FIG. 5, which presents exemplary values obtained by observing data ingressed to the BSC over five consecutive observation windows, namely those marked 1 to 5 in FIG. 4. The number of observation windows, over which the measured data flow is to be considered at any time (here—five) is preferably equal to the number of active subscriber units. FIG. 5A presents the average ingress rate of data addressed to each subscriber unit, as measured over each window. The values in the table are multipliers of the transmission rate of a fundamental channel and thus are akin to the rate level values in FIG. 2A. It is recalled that, by the action of the flow control function in the feeding IP system, the rate of data ingress to the BSC, for any subscriber unit, is assumed to approximately equal the average rate of data actually transmitted to the subscriber unit. Clearly there is also a certain delay involved in this rate equalization process, which delay is also, in part, due to the function of the buffer in the BSC and of the channel allocation process. In our present example we assume, for the sake of clarity and simplicity in the demonstration, an idealized model, wherein the measured rate over a window is exactly equal to the average transmission rate over a corresponding sequence of three time slots.

The correspondence between the windows and the triads of time slots is based on an assumed delay, which is evident from FIG. 4, where window 1 corresponds to time slots 2-4, window 2-to time slots 5-7 etc. Accordingly, the values in FIG. 5A, which should be regarded as simulative, have been obtained by simply averaging the corresponding triads of values in FIG. 2A. It is noted that in actual operation, the values in FIG. 5A would be obtained by measuring the ingress rates, as described above, since all values relating to radio transmission, as those in FIG. 2, would be unknown. It is further noted that, in actual operation, also the relationship between the observation windows and the time slots, as depicted for example in FIG. 4, is not known, nor is such knowledge required for the method of the invention to function.

Figure 5B:
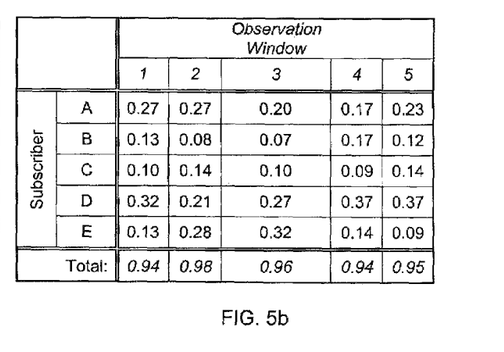

FIG. 5B presents, for each subscriber unit over each observation window, hypothetical relative power levels that are equivalent to the corresponding average rates of FIG. 5A when assuming the respective specific power values of the subscriber units, as listed in FIG. 2B, and a linear power/rate function. The values here are obtained in the same manner as those in FIG. 2C. They could also be obtained by averaging the values in FIG. 2C over corresponding time slots. Indeed they ideally represent the average hypothetical power levels of transmission for the corresponding measured data. It is noted that if eq. 1 is non-linear, the values in FIG. 5B are not exactly averages of transmitted power values, however in practical cases they will generally be close enough thereto for the method of the invention to function with reasonable accuracy. The values of FIG. 5B are presented graphically in the column diagram of FIG. 6, which is similar to that of FIG. 3. It is observed here, again, that the total equivalent relative power, represented by the height of a column, is nearly 1—which is an assumed conditioned underlying the method.

Figure 6:
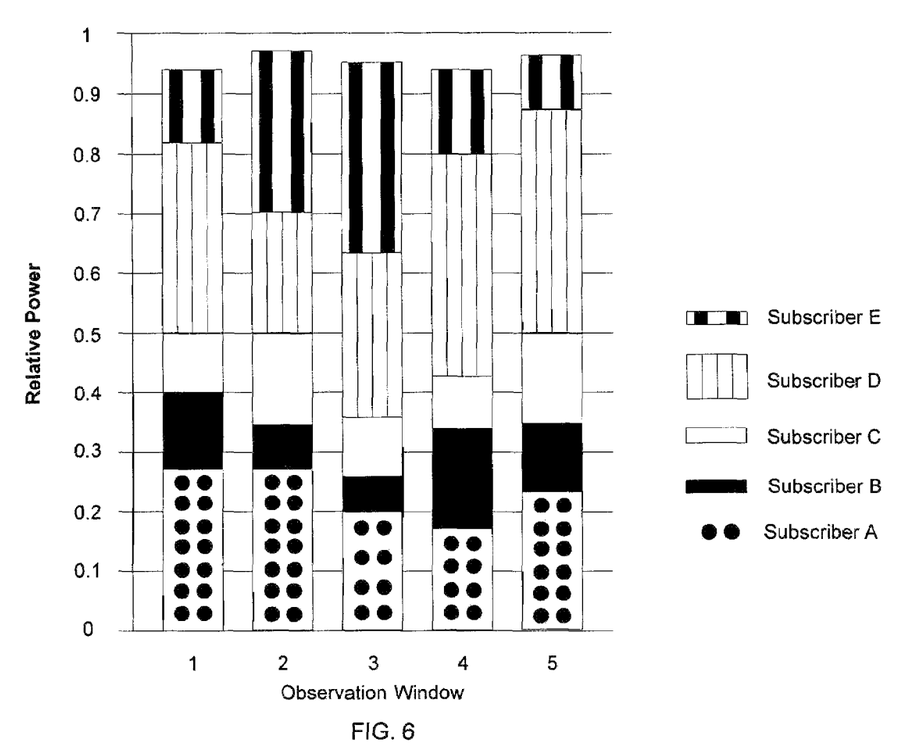
FIG. 6 is a diagram of values derived from the values of FIG. 5, illustrating a principle underlying the method of the invention.

It is noted that, again, since the specific power values are unknown, the values in Table B of FIG. 5 and in FIG. 6 are not known during actual operation and are presented here by way of demonstration only. What can, however, be written, for each observation window, is an equation that relates the (unknown) specific power values, sp, of the subscriber units and their measured ingress rates, R:

$$\sum_u sp_u \times R_{u,w} = 1 \quad (\text{eq. 3})$$

where the index u denotes subscriber unit and the index w denotes observation window. The value R is the measured ingress rate, as appearing for example in Table A of FIG. 5; R is a relative value, representing the rate level and expressed as a multiplier of the fundamental channel rate. Writing such an equation for each of as many windows as there are active subscriber units—five, in the example—we obtain a set of linear equations, which are then solved for the unknown values of the specific power for each subscriber unit. If the relation between transmitted power and rate level is not linear, as it generally is (see eq. 1), each factor R in eq. 3 would be replaced by the appropriate function f(R), to yield—

$$\sum_u sp_u \times f(R_{u,w}) = 1 \quad (\text{eq. 4})$$

A set of such equations is, however, still linear. Clearly, once the estimated values of specific power have been thus calculated, the estimated relative transmitted power levels can be calculated, using equation 1 (or equation 2, in case of a linear function).

The preferred procedure of the invention, with respect to each BTS served by the BSC, is then:
(i) Measure the ingress rate of data, $R_{u,w}$, addressed to each of the N currently active subscriber units communicating with the BTS, over each of a succession of observation windows.
(ii) At the end of each observation window, note the measured R values from the latest N observation windows and calculate therefrom N values of specific power—corresponding to the N subscriber units; the calculation consists, in effect, of solving a set of linear equations—eq. 3 or eq. 4.
(iii) Optionally, calculate relative transmitted power level, by multiplying the results by the corresponding values of R (per eq. 1 or eq. 2).

It will be noted that a new value for each specific power level is thus obtained at the end of each observation window (based on the last N observation windows). This provides for continuous tracking of slowly varying power requirements as the transmission conditions change. When the number of active subscriber units changes, the number of observation windows considered for the calculation changes identically; for example, if the number changes to N+1, rate measurements from the last N+1 are considered. Optionally, any known smoothing function may be applied to each series of specific power values. By default, the thus obtained results serve as estimates of power levels in any subsequent time period (which estimates are, as noted in the Background section, an object of the invented method). However, any known estimation or prediction procedure may optionally be applied to the results in order to obtain better or more reliable estimates.

Several factors may affect the accuracy of the results, with respect to any BTS. These include, inter alia—
(a) instances of under-usage of available power (e.g. due to reduced total data ingress and buffer starvation);
(b) instances of long gaps in data flow to some of the subscriber units;
(c) rapidly varying radio channel conditions to some of the subscriber units;
(d) duration of observation window too short for a given buffer size;
(e) large proportion of packets retransmitted from the BSC to some subscriber units (caused by radio transmission errors).

It is expected that inaccuracy effected by such factors, even cumulatively, will generally not disruptively affect the functions (e.g. channel allocation by an auxiliary module) for which the obtained power information is required. It is observed that in the cases of an occurrence of the first factor (operation at overall low data rate, requiring total power considerably below the maximum), efficient channel allocation (as would be provided by an auxiliary module) becomes ipso facto irrelevant.

It would seem that the presence of an external scheduling unit between the PDSN and the BSC may affect the accuracy or reliability of the obtained results, inasmuch as the module controls the ingress data flow (which is the variable measured according to the method of the invention). It is noted, however, that the data flow into such a unit is usually regulated by the TCP/IP flow control mechanism (as described above), according to the (altered) ingress rate to the BSC and the resulting reception rates at the SUs; thus, in any case, the data flow measured at the ingress to the BSC is essentially identical to the flow of data radio transmitted to the SUs. At worst, the unit may introduce some additional delay into this control loop.

It should be understood that the method of the invention, although described above in terms of a CDMA cellular telephone transmission system, is also applicable to other transmission systems having data transmission characteristics such as discussed above. It should as well be understood that the invention also contemplates a computer program being readable by a computer for executing the method of the invention. The invention further contemplates a machine-readable memory tangibly embodying a program of instructions executable by the machine for executing the method of the invention. It should further be understood that other configurations and embodiments of the method of the invention are possible, all coming within the scope of the invention.

Figure 7:
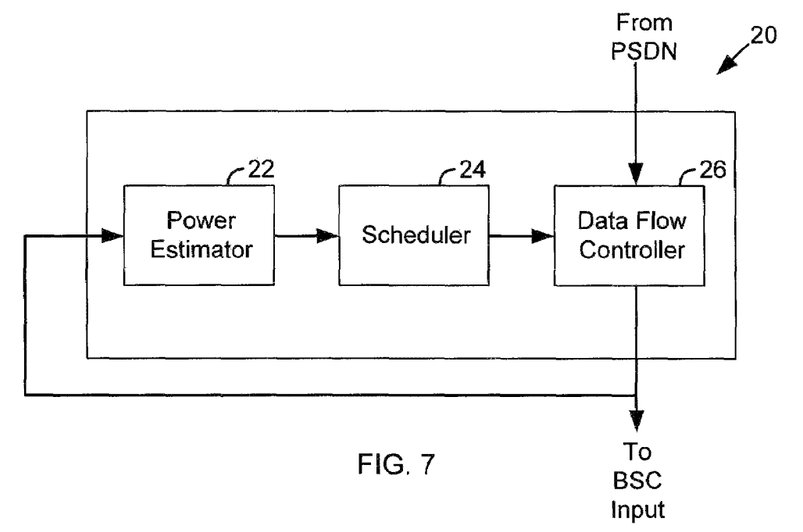
FIG. 7 is a block diagram of an external unit, including a power estimator according to the invention.

The invention further contemplates an external unit, connectable to the input of the BSC 14 (FIG. 1), preferably serving to schedule data transmission from the buffer within the BSC to SUs, through corresponding BTSs. As explained in the background section, such scheduling is generally effected by controlling the rates of data addressed to each SU that are input to the BSC and is preferably aided by channel allocation procedures, disclosed in above-mentioned co-pending Israeli Patent Application No. 151644 but not forming part of the present invention. Accordingly and in common with existing units of the type (as outlined in the Background section), the external unit 20, illustrated by the block diagram of FIG. 7, preferably includes a scheduler 24, operative to allocate channels and schedule data transmission, and/or a data flow controller 26, operative to control the flow, from the PDSN 12 to the BSC 14, of data addressed to each SU. According to the invention, however, the external unit 20 also includes a power estimator 22, which preferably includes a digital processor programmed to carry out the method of the invention. The estimated specific power values, output by the estimator 22, are fed to the scheduler 24 (or else directly to the controller 26), which receives them and uses them in its operation. Optionally, the received estimated specific power values are first processed by a prediction module within the Scheduler or the Controller, to obtain corresponding predicted specific power values, which are operated on.

It will also be appreciated that, while in the preferred embodiment the power estimator is provided as an external add-on unit for coupling to an existing network, the functionality of the power estimator may alternatively be provided within the PDSN, or any similar component of the cellular system. In such case, the estimated specific power values, calculated by the power estimator, are used by the PSDN (or a similar component) in controlling the data flow to any BSC connected thereto.

In the method claims that follow, alphabetic characters and Roman numerals used to designate different operations are provided for convenience only and do not imply any particular order of performing the operations.

The invention claimed is:

1. In a cellular radio system that transmits data from an IP-based network, through a base station controller (BSC) and any Base Station Transceiver (BTS) controlled by the BSC, to a plurality of active subscriber units, which are in radio communication with the BTS and in a data connection state, data transmission from the BTS to any active subscriber unit at any time being at one of a plurality of given transmission rates and at a defined power level, relative to a maximum total power transmittable by the corresponding BTS;
a method for estimating a specific power of transmission from the BTS to each of the active subscriber units at any given time, the method comprising:
defining in time a succession of observation windows;
observing the data flowing into the BSC and addressed to each of the active subscribers and, for each subscriber, measuring an amount of such data flowing during each of a plurality of said observation windows, obtaining measured amounts; computing an average rate multiplier for each active subscriber; calculating using said measured amounts an estimated specific power for each of the subscribers.

2. The method of claim 1, wherein the duration of each observation window is an integral multiple of allocation time slots.

3. The method of claim 1, wherein said plurality of windows is N windows, where N is equal to the number of active subscriber units.

4. The method of claim 3, wherein said calculating includes solving N simultaneous equations.

5. The method of claim 4, wherein the N equations are linear equations having N unknowns and N×N coefficients, the unknowns being proportional to specific power values of respective subscriber units and the coefficients being proportional to corresponding results from said measuring.

6. The method of claim 1, further serving to schedule the transmission of data from the BTS to the active subscribers and further comprising:
using said estimated specific power of all the subscriber units to schedule data transmission to the subscribers.

7. The method of claim 1, further serving to control data flow into the BSC and further comprising:
using the results of said estimation to control the flow into the BSC of data addressed to the active subscriber units.

8. The method of claim 1, where total power transmitted by the BTS during each of a plurality of said observation windows is equal to sum of products of the average rate multiplier by the estimated specific power for each of the subscribers.

9. An apparatus connectable to a data ingress port of a base station controller (BSC) of a cellular radio system that transmits data from an IP-based network, through the BSC and any Base Station Transceiver (BTS) controlled by the BSC, to a plurality of active subscriber units, which are in radio communication with the BTS and in a data connection state, data transmission from the BTS to any active subscriber unit at any time being at one of a plurality of given transmission rates and at a defined power level, relative to a maximum total power transmittable by the corresponding BTS;
said apparatus serving to control the transmission of data from the BTS to the active subscriber units and comprising a processor configured
to define in time a succession of observation windows;
to observe the data flowing into the BSC and addressed to each of the subscribers and, for each subscriber, to measure an amount of such data flowing during each of a plurality of said observation windows;
to compute an average rate multiplier for each active subscriber;
and to calculate, using any results of said measuring, an estimated specific power for each of the subscriber units.

10. The apparatus of claim 9, further comprising a scheduler, responsive to said estimated specific power values and operative to schedule data transmission from the BTS to the active subscriber units.

11. The apparatus of claim 9, wherein the scheduler is further operative to calculate from said estimated specific power values predicted power values.

12. The apparatus of claim 9, further comprising a data flow controller, responsive to said scheduling and operative to control the flow into the BSC of data addressed to the active subscriber units.

13. The method of claim 9, where total power transmitted by the BTS during each of a plurality of said observation windows is equal to sum of products of the average rate multiplier by the estimated specific power for each of the subscribers.

14. A cellular radio system, including at least one base station controller (BSC) and at least one Base Station Transceiver (BTS), controlled by any of the BSCs, and operative to transmit data from an IP-based network, through any BSC and any BTS controlled by it, to a plurality of active subscriber units, which arc in radio communication with the BTS and in a data connection state, data transmission from the BTS to any active subscriber unit at any time being at one of a plurality of given transmission rates and at a defined power level, relative to a maximum total power transmittable by the corresponding BTS;

the system comprises a processor, having access to data flowing into the BSC and is configured     to define in time a succession of observation windows;

to observe the data flowing into the BSC and addressed to each of the subscribers and, for each subscriber, to measure an amount of such data flowing during each of a plurality of said observation windows;

to compute an average rate multiplier for each active subscriber;

and to calculate, using the results of said measuring, an estimated specific power for each of the subscribers.

15. The method of claim 14, where total power transmitted by the BTS during each of a plurality of said observation windows is equal to sum of products of the average rate multiplier by the estimated specific power for each of the subscribers.

\* \* \* \* \*